US011202992B2

(12) United States Patent
Cerea et al.

(10) Patent No.: US 11,202,992 B2
(45) Date of Patent: Dec. 21, 2021

(54) PROCESS FOR THE PRODUCTION OF NITRIC ACID WITH TERTIARY ABATEMENT OF N2O AND NOX

(71) Applicant: Casale SA, Lugano (CH)

(72) Inventors: Iacopo Cerea, Lugano (CH); Giada Franceschin, Como (IT); Raffaele Ostuni, Lugano (CH)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 16/652,570

(22) PCT Filed: Oct. 3, 2018

(86) PCT No.: PCT/EP2018/076916
§ 371 (c)(1),
(2) Date: Mar. 31, 2020

(87) PCT Pub. No.: WO2019/105635
PCT Pub. Date: Jun. 6, 2019

(65) Prior Publication Data
US 2020/0289982 A1 Sep. 17, 2020

(30) Foreign Application Priority Data
Nov. 30, 2017 (EP) .................... 17204618

(51) Int. Cl.
*C01B 21/26* (2006.01)
*B01J 21/06* (2006.01)
(Continued)

(52) U.S. Cl.
CPC ........ *B01D 53/8625* (2013.01); *B01J 21/063* (2013.01); *B01J 23/22* (2013.01);
(Continued)

(58) Field of Classification Search
CPC .............. B01D 53/565; B01D 53/8625; B01D 53/8631; B01D 2221/00; B01D 2257/00;
(Continued)

(56) References Cited
U.S. PATENT DOCUMENTS 7,951,742 B2 * 5/2011 Chen ................. B01D 53/8625
502/64
2017/0197178 A1 7/2017 Perbandt
2017/0334722 A1 11/2017 Schwefer et al.

FOREIGN PATENT DOCUMENTS

| EP | 1515791 A1 | 3/2005 |
| EP | 2576019 A1 | 4/2013 |
| WO | 2017/072332 A1 | 5/2017 |

OTHER PUBLICATIONS

International Search Report issued in connection with PCT/EP2018/076916, Jul. 2018.
(Continued)

*Primary Examiner* — Timothy C Vanoy
(74) *Attorney, Agent, or Firm* — Akerman LLP

(57) ABSTRACT

A nitric acid production process, comprising tertiary abatement of N2O and NOx on a tail gas withdrawn from an absorption stage, said abatement including passing the tail gas over a sequence of a deN2O stage comprising a Fe-z catalyst and a deNOx stage comprising a V2O5-TiO2 catalyst in the presence of gaseous ammonia, wherein the tail gas at the inlet of deN2O stage and the tail gas at the inlet of deNOx stage have a temperature greater than 400° C.

24 Claims, 1 Drawing Sheet

(51) Int. Cl.
  *B01J 23/22* (2006.01)
  *B01J 29/072* (2006.01)
  *B01J 35/00* (2006.01)
  *B01D 53/86* (2006.01)

(52) U.S. Cl.
  CPC ......... *B01J 29/072* (2013.01); *B01J 35/0006* (2013.01); *C01B 21/26* (2013.01); *B01D 2251/2062* (2013.01)

(58) Field of Classification Search
  CPC ........ B01D 2257/402; B01D 2257/404; B01D 2258/02; B01J 8/00; B01J 8/04; B01J 12/007; B01J 19/00; B01J 2208/00; B01J 2219/00002; C01B 21/38; C01B 21/40
  See application file for complete search history.

(56) References Cited

OTHER PUBLICATIONS

International Preliminary Report on Patentability issued in connection with PCT/EP2018/076916, Nov. 2019.

\* cited by examiner

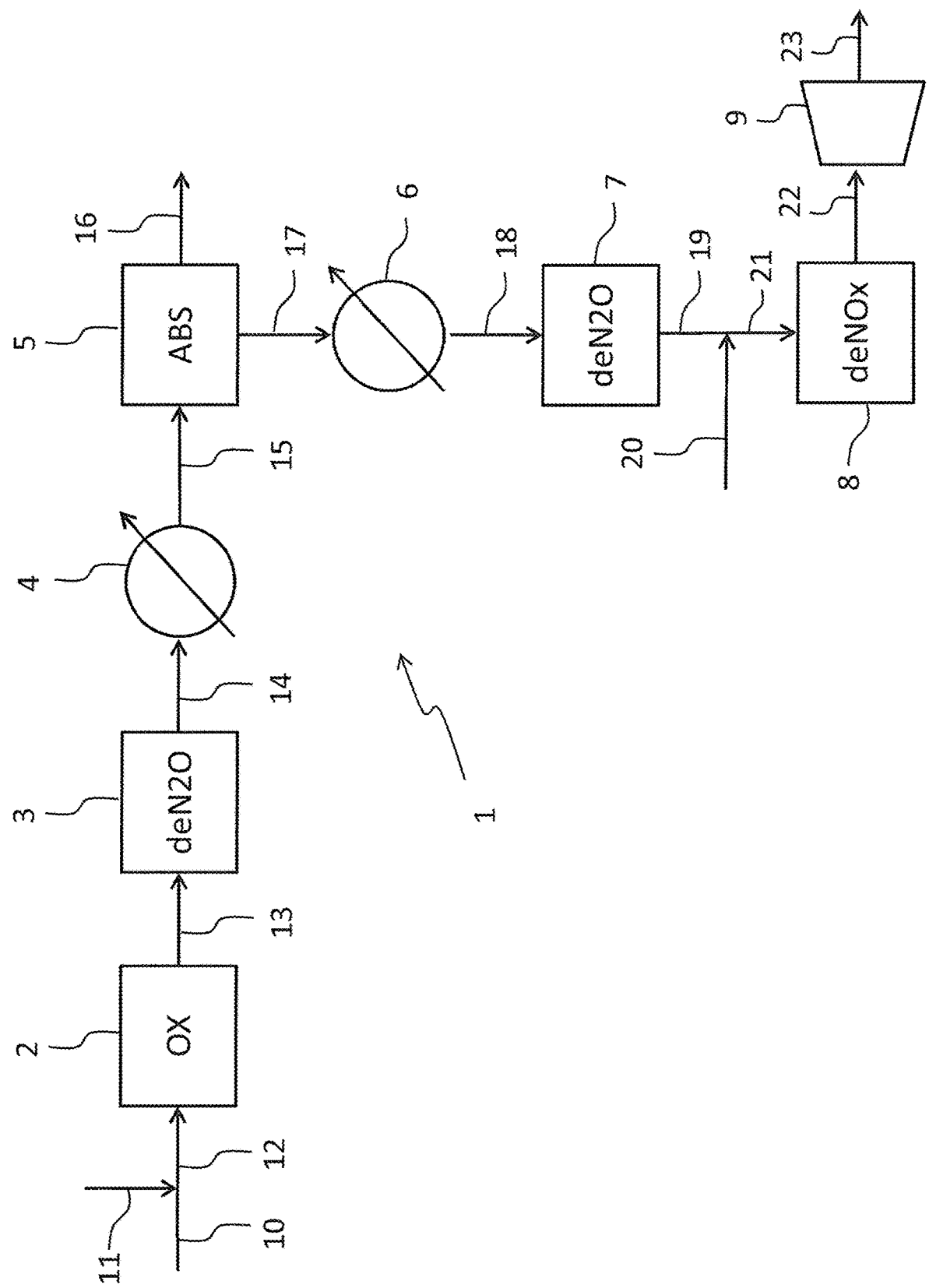

PROCESS FOR THE PRODUCTION OF NITRIC ACID WITH TERTIARY ABATEMENT OF N2O AND NOX

CROSS-REFERENCE TO RELATED APPLICATIONS

This application is a national phase of PCT/EP2018/076916, filed Oct. 3, 2018, and claims priority to EP 17204618.7, filed Nov. 30, 2017, the entire contents of both of which are hereby incorporated by reference.

FIELD OF THE INVENTION

The invention relates to the field of production of nitric acid. More in detail, the invention relates to tertiary abatement of N2O and NOx in a nitric acid production process.

PRIOR ART

The industrial process for the synthesis of nitric acid involves basically the catalytic oxidation of ammonia typically over platinum-rhodium (Pt—Rh) catalytic gauzes, producing a gas containing N2O and nitrogen oxides (NO and NO2), and a subsequent step of absorption, wherein said gas is contacted with water to absorb NO2 in water and produce nitric acid. N2O is not absorbed. The absorption stage delivers a nitric acid containing product stream but also a tail gas containing N2O and residual NOx (e.g. N2O and unconverted NO2). Said tail gas is at super-atmospheric pressure and is normally work-expanded in a suitable expander for energy recovery before being discharged into the atmosphere.

NOx and N2O are known pollutants and the related emissions are subject to strict regulations. A gas vented in atmosphere may be required to meet very low limits of NOx and N2O content, such as a maximum content of 100 ppm each or even less. Removing the above compounds to such a low concentration however may introduce a significant cost. Therefore, there is a strong incentive in the development of a cost-effective process for removing NOx and N2O from the tail gas of a nitric acid production process.

The symbol NOx collectively denotes the so-called nitrogen oxides, namely nitrogen monoxide (NO), nitrogen dioxide (NO2) and possibly N2O4. A stage or a process step for reduction of N2O content in a gas is termed deN2O and a stage or a process step for reduction of NOx content is termed deNOx.

In the field of nitric acid production process, the abatement of N2O and/or NOx is termed from primary to quaternary according to the stage of the nitric acid process. Abatement of N2O and NOx from the tail gas of the absorption stage and upstream of the tail gas expander is termed tertiary abatement. N2O does not play a role in the formation of nitric acid and, therefore, may also be removed in the previous process steps. Removal of N2O from the gas after the oxidation of ammonia and before the absorption stage is referred to as secondary abatement, whilst measures aimed to avoid N2O formation during the oxidation of ammonia are called primary abatement. Abatement of N2O and/or NOx performed after the expansion (i.e. downstream of the expander) is termed quaternary abatement.

A known process for removing NOx and N2O from a gas involves a catalytic decomposition of N2O over an iron-loaded zeolite (Fe-z), particularly an iron-exchanged catalyst followed by selective catalytic reduction (SCR) of NOx with a suitable reducing agent. The reducing agent is commonly ammonia.

The prior art teaches to operate a SCR deNOx stage with a molar ratio of NO/NO2 around 1, which means the molar ratio of NO2/NOx (also termed degree of oxidation) is approximately 50%. Under the above conditions the selective catalytic reduction of NOx is also termed "fast SCR".

Suitable catalysts for the selective catalytic reduction of NOx include V2O5-TiO2 based catalysts and Fe-z catalysts. The Fe-z catalysts, however, are expensive and their use for SCR of NOx introduces a significant cost. A known catalyst which is suitable for SCR of NOx and less expensive than Fe-z catalysts is V2O5-TiO2 based catalyst. In V2O5-TiO2 based catalysts, TiO2 acts as a carrier, V2O5 is the active component. V2O5-TiO2 based catalyst may contain additional components further to V2O5 and TiO2, for example WO3; WO3 is believed to perform as the promoter to stabilize the catalyst. However the V2O5-TiO2 based catalyst has the drawback of possible formation of N2O as a by-product, which is evidently undesired.

The formation of N2O in a deNOx stage over V2O5-TiO2 catalyst, in the presence of ammonia and oxygen, is basically due to the following reactions:

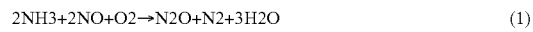

$$2NH_3 + 2NO + O_2 \rightarrow N_2O + N_2 + 3H_2O \quad (1)$$

$$2NH_3 + 2O_2 \rightarrow N_2O + 3H_2O \quad (2)$$

The prior art teaches that SCR deNOx over a V2O5-TiO2 catalyst must be performed at a relatively low temperature of less than 400° C., and much preferably less than 350° C., to avoid undesired formation of N2O. In some instances, however, this may require a preliminary step of cooling the gas through a heat exchanger, introducing an additional cost and a significant pressure drop of the gas. The undesired formation of N2O might be compensated by increasing the amount of de-N2O catalyst, which however is generally not acceptable in terms of costs.

The current preferred options to meet the N2O and NOx maximum permissible emissions in a nitric acid production process include the following.

A first option is tertiary abatement of N2O and NOx contained in the tail gas via catalytic decomposition of N2O over Fe-z catalyst, followed by selective catalytic reduction (SCR) of NOx which is also performed over Fe-z catalyst with ammonia as reducing agent. Decomposition of N2O is preferably carried out at a temperature greater than 400° C., for example 450° C., and the subsequent SCR of NOx over iron-zeolite can be carried out substantially at the same temperature, thus requiring no cooling between the two stages. However this technique requires a large amount of the expensive Fe-z catalyst.

A second option includes tertiary abatement of N2O over Fe-z catalyst at a high temperature greater than 400° C. followed by intermediate gas cooling and SCR of NOx over a V2O5-TiO2-based catalyst at a low temperature, for example less than 350° C. and more preferably less than 300° C. Operating SCR with V2O5-TiO2 catalysts at low temperature is encouraged in the prior art to maximize selectivity of NOx removal, and avoiding formation of N2O. On the other hand, the previous N2O abatement must be performed at a high temperature above 400° C. to achieve acceptable performance. Therefore, this technique requires an inter-stage cooling step between the de-N2O and de-NOx stage, in a dedicated heat exchanger. The inter-stage cooling introduces a substantial capital cost and a significant pressure drop. The pressure drop entails lower energy recovery in the downstream tail gas expander. Still another drawback of this solution is that the relatively low temperature of the de-NOx stage will result in a lower inlet temperature and therefore also a lower outlet temperature of the tail gas expander, which may favour the formation of ammonium nitrate in the expander thus introducing a safety concern.

A further option is based on secondary catalytic decomposition of N2O at high temperature and relatively low pressure downstream of the ammonia oxidation stage, using known secondary DeN2O catalysts, installed in the same equipment of the ammonia oxidation (the burner). This technique can be combined with tertiary SCR of NOx over a V2O5-TiO2 catalyst.

However, this method has a disadvantage in that strict pressure drop limitations dictate a height/diameter ratio (aspect ratio) of the secondary catalyst bed of less than 0.1, typically less than 0.03. The pressure drop limitations are due to mechanical resistance of the equipment that holds the catalyst and to the energy consumption for compression.

A large pressure drop would increase the stress condition on the walls of the catalytic bed and mechanical support of the catalyst bed, both of which operate under severe temperature conditions, typically between 800° C. and 1000° C.

The added pressure drop would also require more energy for compression. The increased pressure drop over the catalyst may either increase compression energy for the air directed to the burner, or compression energy for the NOx, or both. The very low aspect ratio however entails the problem of maldistribution of the reactant stream in the catalyst bed, and bypass streams of the catalyst bed with consequent slip of unconverted N2O. Another reason for bypass of the catalyst is the sealing system of the catalyst basket to the burner vessel. A large increase of catalyst volume, or multiple catalyst beds in series would be required to counteract the distribution and bypass problems. Both would be expensive, generate further additional pressure drop, and increase the size of the equipment.

Another drawback of this option, according to the prior art, is that the secondary catalyst has a relatively short life, i.e. the catalyst loses activity for N2O decomposition over relatively short periods of time (e.g. 1-2 years). Aging of the catalyst may be due to the severe operating conditions (e.g. high operating temperature) of the catalyst. A loss of activity entails an increased N2O slip over time. Therefore, achieving low emissions by this method is undesirable.

Taking all the above into account, there is still the need of an efficient and cost-effective process for reducing the content of N2O and NOx in the offgas of nitric acid production.

EP 1 515 791 discloses a process of reducing the content of N2O and NOx in a gas, comprising passing the gas over a sequence of two Fe-z catalyst beds and adding a reducing agent between said two beds.

EP 2 576 019 discloses a process of reducing the content of N2O and NOx in a gas, including reducing the content of N2O in a deN2O stage with Fe-z catalyst at a temperature of 400 to 650° C., cooling the gas effluent of the deN2O stage to a temperature below 400° C., reducing the content of NOx in the cooled gas in a deNOx stage with a V2O5-TiO2 catalyst and in the presence of a reducing agent added after exiting the deN2O stage.

WO 2017/072332 discloses a method and apparatus for removing NOx and N2O from a gas wherein the gas passes through a first deNOx stage, a deN2O stage and then a second deNOx stage.

SUMMARY OF THE INVENTION

The invention aims to solve the above mentioned drawbacks. The invention aims to provide a process for the abatement of N2O and NOx in a nitric acid production process which is able to meet a very low output of N2O and NOx but at the same time does not require a large amount of expensive catalyst and/or a high capital cost for equipment.

The aims are reached with a nitric acid production process, comprising a step of catalytic oxidation of ammonia, producing a process gas comprising nitrogen oxides and N2O, and a step of absorption of said process gas with water, producing a product stream containing nitric acid, and a stream of a tail gas containing NOx and N2O, wherein the content of NOx and N2O of said gas stream is reduced by the steps of:

passing said gas stream over a deN2O first stage comprising an iron-loaded zeolite catalyst for decomposition of N2O obtaining an effluent gas stream with a reduced content of N2O, passing said effluent of the deN2O stage over a deNOx second stage comprising a V2O5-TiO2 catalyst, in the presence of gaseous ammonia as a reducing agent, characterized in that:

a) the N2O and NOx containing gas streams at the inlet of said first stage and at the inlet of said second stage have a temperature greater than 400° C., and at least one of the following conditions is met:

b1) the N2O and NOx containing gas stream before admission into the first stage has a NOx molar content of less than 1000 ppm;

b2) the N2O and NOx containing gas stream before admission into the first stage has O2 molar content of less than 4%;

b3) the molar ratio of ammonia over NOx at the inlet of the second stage is 0.9 to 1.1.

The iron-loaded zeolite is preferably an iron-exchanged zeolite.

The tail gas effluent from the absorber is fed directly to the first deN2O stage without any previous stage of removal of NOx, i.e. without passing through a deNOx stage.

The iron-loaded zeolite catalyst is preferably any of: MFI, BEA, FER, MOR, FAU, MEL, or a combination thereof. Preferably, said iron-loaded zeolite catalyst is of the Fe-ZSM-5 type.

The invention is based on the very unexpected finding that the undesired formation of N2O over a V2O5-TiO2 catalyst and in the presence of ammonia and oxygen at temperature greater than 400° C. is offset by at least one, and preferably two or all, of the above conditions b1), b2) and b3).

In preferred embodiments, the above condition b1) further provides that said gas stream containing NOx and N2O, before admission into the first stage, has a NOx molar content of less than 750 ppm and preferably less than 500 ppm.

In preferred embodiments, the above condition b2) further provides that said gas stream containing NOx and N2O, before admission into the first stage, has O2 molar content of less than 3%. Preferably the O2 molar content is 1% to 2.8%.

In preferred embodiments, the above condition b3) further provides that the molar ratio of ammonia over NOx at the inlet of the second stage is 0.95 to 1.05, preferably equal to 1 or approximately 1. In particularly preferred embodiments, said ratio is slightly less than 1. For example in preferred embodiments said ratio is 0.95 to 0.99.

Preferably, the above condition a) provides that the N2O and NOx containing gas streams has a temperature equal to or greater than 415° C., preferably equal to or greater than 430° C., at the inlet of the first stage (deN2O stage) and at the inlet of the second stage (deNOx stage).

Accordingly, both the first catalytic bed and the second catalytic bed operate at a temperature equal to or greater than 415° C., preferably equal to or greater than 430° C.

The reactions occurring in the deN2O stage and deNOx stage are exothermic and, therefore, the temperature of the gas may increase from the inlet to the outlet of each stage. In a preferred embodiment, each of said deN2O stage and deNOx stage has a peak gas temperature of at least 415° C., preferably at least 430° C.

In a very preferred embodiment, the effluent of the first stage is not subject to intermediate cooling through an intermediate cooling stage between the two catalytic beds. Accordingly, the effluent of the first stage is directly fed to the second stage without a passage through a cooling device, such as a heat exchanger.

In preferred embodiments, said step of absorption is performed at a relatively high pressure. Preferably said absorption pressure is equal to or greater than 6 bar, more preferably equal to or greater than 9 bar and even more preferably equal to or greater than 11 bar. The deN2O stage and deNOX stage operate substantially at the same pressure as the absorption, apart from pressure losses.

An advantage of such high absorption pressure is that the high pressure favors absorption of NO2 in water thereby entailing a low residual NOx content in the tail gas. Therefore, the above mentioned high pressure of absorption (equal to or greater than 6 bar, and preferably than 9 or 11 bar) favors the achievement of the condition b1).

Another important aspect of the invention is a temperature higher than 400° C. and preferably about 430° C. of both stages, particularly of the V2O5-TiO2 deNOx stage. At this temperature, the deN2O stage over Fe-z catalyst is effectively operated with industrially practical and competitive space velocities. The high temperature of operation of said deNOx stage, in combination with one or more of the above conditions b1), b2) and b3), ensure that: i) little or no additional deN2O catalyst volume is required to compensate the N2O formation in the deNOx stage; ii) NOx abatement is achieved with industrially competitive amount of deNOx catalyst in the second catalytic bed.

Still other aspects of the invention include that the condition b2) provides a relatively low amount of diatomic oxygen in the first stage and that the condition b3) provides a relatively low amount of ammonia in the second stage.

The prior art teaches to operate catalytic beds for SCR of NOx under some excess of ammonia. Furthermore, the prior art of nitric acid production generally teaches to operate absorption under excess of O2 to promote oxidation of NO to NO2 and the formation of nitric acid, and also to keep the degree of oxidation close to the preferred value of around 50%. As stated above, the prior art strongly indicates to run a V2O5-TiO2 deNOx stage under the above conditions and at a temperature of 300-350° C.

The present invention discloses the unexpected finding that the faster kinetics, due to the relatively high temperature (>400° C.), compensates for a lack of excess ammonia and a deviation from the ideal degree of oxidation in the deNOx stage. The high temperature, on the other hand, is highly beneficial for the deN2O stage upstream. The lack of a heat exchanger between the two stages is advantageous from both points of views of cost and pressure losses.

In a preferred embodiment, a process of the invention fulfils all the above conditions b1, b2 and b3. This has a synergistic effect in the mitigation of the formation of N2O in the second stage.

In some embodiments of the invention, the N2O byproduct formation is limited to less than 30 ppm, typically less than 15 ppm.

Still another advantage of the high temperature is a lower risk of ammonium nitrate deposits downstream of the expander, due to the higher inlet temperature and consequently higher outlet temperature of tail gas expander, to the advantage of safety.

A further advantage of the invention is a combination of high temperature and high pressure in the abatement stage resulting in more energy recoverable in the tail gas expander and therefore a lower energy consumption of the whole process for nitric acid production.

The deN2O stage may comprise one or more catalytic bed(s). Also the deNOx stage may comprise one or more catalytic bed(s). In some embodiments, the one or more beds of the deN2O stage and the one or more beds of the deNOx stage are accommodated in a common pressure vessel. In some embodiments, the one or more beds of the deN2O stage are accommodated in a first pressure vessel and the one or more beds of the deNOx stage are accommodated in a second pressure vessel.

The one or more beds of the deN2O stage and the one or more beds of the deNOx stage are preferably radial-flow beds, i.e. they are traversed by the N2O and NOx containing gas with a substantially radial flow.

The deN2O catalyst bed can be a packed bed of pellets, preferably of radial design. The radial design is preferred because it entails a low pressure drop.

The advantage of the deN2O in tertiary position is that catalyst bypass (with consequent unreacted slip of N2O) can be minimized or practically avoided. In the case of axial bed, the catalyst can be loaded directly in the vessel and bypass streams are avoided. In the case of radial design, the catalyst is loaded in a basket that is put in the reactor vessel. In this case the bypass stream can be minimized or practically avoided by means of the sealing between the catalyst basket and the vessel, which is typically a circumferential sealing. The sealing with low bypass is favored by the fact that vessels of tertiary abatement system are slim, so they have relatively small diameter, so the cross area available to bypass stream is low, and the bypass flow is consequently small or negligible.

A process according to the invention may further include a secondary stage of catalytic N2O decomposition based on a suitable secondary deN2O catalyst. Said secondary deN2O catalyst can be a monolith catalyst or a pellet catalyst. A pellet catalyst is usually preferred being less expensive. Accordingly, the abatement of N2O and NOx may include a secondary deN2O stage in combination with tertiary deN2O and deNOx stages.

Preferably, said secondary deN2O stage is only used for a partial N2O abatement, preferably less than 90% N2O abatement, more preferably less than 80% relative to the amount at the inlet of said stage.

This preferred embodiment has several advantages, as follows. A first advantage is that maldistribution or bypass streams of the secondary catalyst resulting in N2O slip from the secondary deN2O stage will not directly result in plant/process N2O emissions, because the escaped N2O is removed in the tertiary deN2O stage.

A second advantage is that the amount of catalyst in the secondary deN2O stage can be drastically reduced, and the catalytic bed of said secondary deN2O stage can be operated at high space velocity. Further, the catalyst volume of the two N2O abatements can be synergistically optimized achieving a lower installed amount and lower investment cost compared to separate systems.

A third advantage is a lower pressure drop on the secondary catalyst bed, hence lower energy consumption.

A fourth advantage is that the tertiary deN2O stage will compensate for aging of the secondary catalyst thereby improving the ability of the whole system to provide long term low N2O emissions.

A fifth advantage is that the secondary catalyst volume is smaller, and can more easily fitted in the burner downstream of the ammonia oxidation stage (Pt—Rh gauzes).

All the above demonstrates that the invention enables achieving low emission limits of NOx and N2O in a cost effective way.

A further aspect of the invention is a nitric acid production plant, including at least a reactor for catalytic oxidation of ammonia and an absorber for production of nitric acid, said absorber producing a nitric-acid containing product stream and a tail gas containing N2O and NOx, the plant comprising a tertiary abatement system for abatement of N2O and NOx of said tail gas according to the process described above, the system comprising:

a sequence of at least one first catalytic bed for decomposition of N2O and at least one second catalytic bed for selective reduction of NOx;

said at least one first catalytic bed comprising an iron-loaded zeolites catalyst;

said at least one second catalytic bed comprising a V2O5-TiO2 catalyst;

at least one device to introduce ammonia between said at least one first catalytic bed and said least one second catalytic bed, so that the selective reduction of NOx is performed in the presence of ammonia as reducing agent, a connection arranged to feed the effluent gas of the at least one first catalytic bed to the at least one second catalytic bed including no heat exchanger to cool the gas.

The effluent of the at least one first catalytic bed (deN2O bed) is sent directly to the at least one second catalytic bed (deNOx bed) without a cooling step. Accordingly the system of the invention does not comprise a cooling apparatus installed between the at least one first bed and the at least one second bed.

The first bed(s) and the second bed(s) are preferably installed in a single pressure vessel. A preferred embodiment comprises one deN2O bed and one deNOx bed in a single pressure vessel.

According to various embodiments of the invention, the system may include any combination of axial-flow or radial-flow catalytic beds.

Some preferred embodiments have a radial-flow de-N2O catalytic bed followed by a radial-flow deNOx catalytic bed. Said two radial-flow beds may be arranged concentrically one around the other, or may be vertically aligned one above the other, inside a common pressure vessel. In further embodiments, the de-N2O bed and/or the de-NOx bed are axial-flow. In some embodiments, an axial-flow bed is combined with a radial-flow bed. For example in some embodiments an axial-flow deN2O bed is followed by a radial-flow deNOx bed, or a radial-flow deN2O bed is followed by an axial-flow deNOx bed.

Optionally a secondary deN2O stage can also be provided, in combination with a tertiary system according to the invention.

Still another aspect of the invention is a method to revamp an existing nitric acid plant to reduce emissions. The method can be applied to an existing plant which already comprises the second stage (deNOx stage based on V2O5-TiO2), and in such a case the method comprises the addition of the DeN2O stage based on Fe-z without intermediate cooling, and preferably also the secondary DeN2O stage. In a nitric acid production plant, an advantage of the method is that N2O emissions can be achieved also with small secondary catalyst volume, hence with more ease fitting in existing burner.

BRIEF DESCRIPTION OF THE DRAWINGS

FIG. 1 shows a simplified block scheme of a process for the synthesis of nitric acid plant according to an embodiment of the invention.

DETAILED DESCRIPTION

FIG. 1 illustrates a process/plant 1 for the synthesis of nitric acid which makes use of the invention for tertiary abatement of N2O and NOx in the tail gas withdrawn from the absorber.

The main equipment of the plant 1 comprise: a reactor 2 for the catalytic oxidation of ammonia, a first deN2O stage 3, a cooler 4, an absorption tower 5, a heat exchanger 6, a second deN2O stage 7, a deNOx stage 8 and a gas expander 9. The reactor 2 and the first deN2O stage 3 are typically included in the same equipment (the burner).

The first deN2O stage 3 is in a secondary position according to the nomenclature used in the field of nitric acid production, since it is located after the ammonia oxidizer 2 but before the absorber 5. The second deN2O stage 7 is in a tertiary position, being after the absorber 5 and before the expander 9.

The first deN2O stage 3 comprises a catalytic bed made of a suitable secondary catalyst.

The second deN2O stage 7 comprises a catalytic bed made of iron-exchanged zeolites catalyst. Said deNOx stage 8 comprises a catalytic bed made of V2O5-TiO2-based catalyst. The catalytic bed of the second deN2O stage 7 and the catalytic bed of the deNOx stage 8 can be installed in the same pressure vessel.

Said catalysts can be structured catalysts (e.g. a catalyst deposited or impregnated on a monolithic support such as a honeycomb support) or pellet catalysts according to different embodiments. Either or both of the deN2O and deNOx catalysts can be structured catalysts.

The advantage of the structured catalyst is that it has more available cross area to the passage of the gas than pellet catalyst, hence it entails a low pressure drop even in case of axial flow. Axial flow means flow in the direction of the main axis of the catalyst bed, for example the vertical axis in case of catalyst bed arranged in a vertical reactor.

An ammonia stream 10 and an air flow 11 are mixed to form the input stream 12 of the reactor/ammonia oxidizer 2, wherein ammonia is catalytically oxidized to nitrogen monoxide (NO) over platinum catalytic gauzes. Minor amounts of nitrous oxide (N2O) are formed as byproduct of the ammonia oxidation to NO. A portion of the nitrogen monoxide is further oxidized to nitrogen dioxide (NO2) or dinitrogen tetroxide (N2O4) in the presence of oxygen from the air. The reactor 2 therefore produces a gaseous stream 13 comprising N2O and NOx. Here, the term NOx collectively denotes NO, NO2 and N2O4.

Said gaseous stream 13 is supplied to the first de-N2O stage 3, wherein an amount of N2O is catalytically decomposed over the iron-exchanged zeolites catalyst, providing a gaseous stream 14 with a reduced content of N2O. The amount of N2O decomposed in said stage 3 is preferably not greater than 90%, more preferably not greater than 80% of the N2O contained in the stream 13.

The secondary deN2O stage 3 is an optional feature of the invention. In some embodiments the stream 13 effluent from the reactor 2, possibly after cooling, is directly fed to the absorber 5.

The stream 14 is cooled in the heat exchanger 4 to become stream 15 and subsequently admitted to the absorption tower 5. Inside the absorption tower 5, NOx are at least partially absorbed in water to form a nitric acid containing product 16. Generally, said absorption tower 5 is a tray or packed column.

The absorption tower 5 also provides a tail gas 17, which is mostly composed of nitrogen and contains smaller amounts of oxygen, N2O and residual NOx.

Said tail gas 17 is pre-heated in the heat exchanger 6 to a temperature of about 430° C., and subsequently fed to the second de-N2O stage 7 through the flow line 18. Here, N2O is catalytically decomposed over iron-exchanged zeolites, providing a N2O-depleted effluent 19.

Said N2O-depleted effluent 19 is added with ammonia 20 as reducing agent, thus forming the input stream 21 of the de-NOx stage 8. Inside said stage 8, NOx are catalytically reduced providing a purified gas 22 with a low content of NOx and N2O.

The purified gas 22 is work-expanded in the expander 9 to the atmospheric pressure. The power produced by the expander 9 can be used e.g. to drive compressors of the nitric acid plant (not shown).

The exhaust gas 23 is discharged into the atmosphere. Said exhaust gas 23 typically contains less than 50 ppmv of N2O and less than 50 ppmv of NOx.

Example 1

The following data (table 1) were obtained for tertiary abatement of N2O and NOx in a nitric acid plant, from a tail gas withdrawn from the absorber, using a deN2O stage based on Fe-zeolite followed by a deNOx stage based on V2O5-TiO2. The gas was preheated before the deN2O stage. NH3 was added as reductant before the deNOx stage.

TABLE 1

| Tail gas flow rate | 100 000 Nm³/hour |
| Tail gas inlet temperature (to DeN2O stage) | 430° C. |
| Tail gas pressure | 10 bar absolute |
| Tail gas inlet molar composition | |
| N2O | 1 300 ppmv |
| NOx | 1 000 ppmv |
| Degree of oxidation | 0.2 |
| O2 | 3% |
| N2 | Balance |
| Operation | |
| Space velocity of DeN2O catalyst bed | 10 000 1/h |
| NH3/NOx molar ratio | 1 |
| Space velocity of DeNOx catalyst bed | 20 000 1/h |

The resulting tail gas effluent, after the deNOx stage, has N2O concentration of <50 ppmv (>96% abatement) and a NOx concentration of <50 ppmv (>95% abatement).

Example 2

(comparative example for preferred embodiment of invention with secondary abatement).

A prior art abatement system includes secondary DeN2O (based on known secondary catalyst) and tertiary DeNOx based on V2O5-TiO2 catalyst.

The secondary abatement designed for 95% abatement of N2O and having an inlet N2O of 1200 ppm would theoretically result in 60 ppm residual N2O if there were no bypass around it. A bypass stream of secondary catalyst of at least about 5% of the inlet flow rate is typically to be expected. The N2O in the bypass is unabated. As a consequence, the residual N2O concentration in the gas from the secondary abatement system (including the bypass) is 120 ppm. The stream is treated in the further sections of the prior art nitric acid plant, and it leaves the absorber as tail gas which is treated in the DeNOx. The DeNOx does not abate N2O, which is emitted to atmosphere.

In the case of the invention, the gas from absorber is subjected to further tertiary deN2O upstream deNOx, hence it reaches a lower level of N2O.

What is claimed is:

1. A nitric acid production process, comprising a step of catalytic oxidation of ammonia, producing a process gas comprising nitrogen oxides NOx and N2O, and a step of absorption of said process gas with water, producing a product stream containing nitric acid, and a stream of a tail gas containing NOx and N2O, wherein the content of NOx and N2O of said gas stream is reduced by the steps of:
passing said gas stream, without any previous stage of removal of NOx, over a deN2O first stage comprising an iron-loaded zeolite catalyst for decomposition of N2O, obtaining an effluent gas stream with a reduced content of N2O,
passing said effluent of the deN2O stage over a deNOx second stage comprising a V2O5-TiO2 catalyst, in the presence of gaseous ammonia as a reducing agent, wherein:
a) the N2O and NOx containing gas streams at the inlet of said first stage and at the inlet of said second stage have a temperature greater than 400° C., and
at least one of the following conditions is met:
b1) the N2O and NOx containing gas stream before admission into the first stage has a NOx molar content of less than 1000 ppm;
b2) the N2O and NOx containing gas stream before admission into the first stage has O2 molar content of less than 4%;
b3) the molar ratio of ammonia over NOx at the inlet of the second stage is 0.9 to 1.1.

2. The process according to claim 1, wherein condition b1) further provides that said gas stream containing NOx and N2O, before admission into the first stage, has a NOx molar content of less than 750 ppm.

3. The process according to claim 2, wherein condition b1) further provides that said gas stream containing NOx and N2O, before admission into the first stage, has a NOx molar content of less than 500 ppm.

4. The process according to claim 1, wherein condition b2) further provides that said gas stream containing NOx and N2O, before admission into the first stage, has O2 molar content of less than 3%.

5. The process according to claim 1, wherein condition b3) further provides that the molar ratio of ammonia over NOx at the inlet of the second stage is 0.95 to 1.05.

6. The process according to claim 5, wherein condition b3) further provides that the molar ratio of ammonia over NOx at the inlet of the second stage is equal to 1 or approximately 1.

7. The process according to claim 1, wherein at least two of the conditions b1), b2) and b3) are met.

8. The process according to claim 7, wherein all of the conditions b1), b2) and b3) are met.

9. The process according to claim 1, wherein said condition a) provides that both gas streams at the inlet of the first stage and of the second stage have a temperature equal to or greater than 415° C.

10. The process according to claim 9, wherein said condition a) provides that both gas streams at the inlet of the first stage and of the second stage have a temperature equal to or greater than 430° C.

11. The process according to claim 1, wherein the effluent of the first stage is not subject to intermediate cooling through an intermediate cooling stage before the admission into the second stage.

12. The process according to claim 1, comprising the addition of ammonia to the effluent of the first stage before the admission into the second stage.

13. The process according to claim 1, wherein the byproduct formation of N2O in the second stage is less than 30 ppm.

14. The process according to claim 1, wherein the first stage and/or the second stage comprise one or more radial-flow catalytic beds.

15. The process according to claim 14, wherein one or more catalytic beds of the first stage and one or more catalytic beds of the second stage are either contained in the same vessel or in two separate vessels for the first stage and second stage respectively.

16. The process according to claim 1, wherein said step of absorption is performed at an absorption pressure equal to or greater than 6 bar.

17. The process according to claim 16, wherein said step of absorption is performed at an absorption pressure equal to or greater than 9 bar.

18. The process according to claim 16, wherein said step of absorption is performed at an absorption pressure equal to or greater than 11 bar.

19. The process according to claim 1, further comprising a step of reducing the content of N2O of said process gas obtained from the catalytic oxidation of ammonia, before the absorption step.

20. The process according to claim 19, wherein said step of reducing the content of N2O of said process gas includes a catalytic decomposition of N2O.

21. A nitric acid production plant, including at least a reactor for catalytic oxidation of ammonia and an absorber for production of nitric acid, said absorber producing a nitric-acid containing product stream and a tail gas containing N2O and NOx, the plant comprising a tertiary abatement system for abatement of N2O and NOx of said tail gas with a process according to claim 1, the system comprising:
  a sequence of at least one first catalytic bed for decomposition of N2O and at least one second catalytic bed for selective reduction of NOx, said at least one first catalytic bed comprising an iron-loaded zeolites catalyst and said at least one second catalytic bed comprising a V2O5-TiO2 catalyst wherein said at least one catalytic bed for decomposition of N2O receives the tail gas effluent from the absorber without any previous removal of NOx;
  at least one device to introduce ammonia between said at least one first catalytic bed and said least one second catalytic bed, so that the selective reduction of NOx is performed in the presence of ammonia as reducing agent,
  a connection arranged to feed the effluent gas of the at least one first catalytic bed to the at least one second catalytic bed including no heat exchanger to cool the gas.

22. The plant according to claim 21, wherein the at least one first catalytic bed and the at least one second catalytic bed are contained in a single pressure vessel.

23. The plant according to claim 21, wherein the at least one first catalytic bed and/or the at least one second catalytic bed are axial-flow and comprises a structured catalyst, wherein the catalyst is deposited or impregnated on a monolithic support.

24. The plant according to claim 23, wherein the at least one first catalytic bed and/or the at least one second catalytic bed are axial-flow and comprises a structured catalyst, wherein the catalyst is deposited or impregnated on a honeycomb support.

* * * * *